(12) United States Patent
Lee

(10) Patent No.: US 10,660,180 B2
(45) Date of Patent: May 19, 2020

(54) LIGHT SOURCE DRIVER

(71) Applicant: Avago Technologies International Sales Pte. Limited, Singapore (SG)

(72) Inventor: Kah Weng Lee, Singapore (SG)

(73) Assignee: Avago Technologies International Sales Pte. Limited, Singapore (SG)

( * ) Notice: Subject to any disclaimer, the term of this patent is extended or adjusted under 35 U.S.C. 154(b) by 1239 days.

(21) Appl. No.: 14/522,407

(22) Filed: Oct. 23, 2014

(65) Prior Publication Data

US 2016/0119993 A1    Apr. 28, 2016

(51) Int. Cl.
*H05B 33/08* (2020.01)
*H05B 45/50* (2020.01)
*H05B 45/00* (2020.01)

(52) U.S. Cl.
CPC ............. *H05B 45/50* (2020.01); *H05B 45/00* (2020.01)

(58) Field of Classification Search
CPC ............ H05B 33/0815; H05B 33/0851; H05B 33/0845; H05B 33/0842; H05B 37/02; H05B 33/0884; Y10S 362/80; Y02B 20/347; Y02B 20/346; G09G 3/3406; H02M 3/156; H02M 3/33507
USPC ................... 315/307, 291, 224, 308; 345/82; 323/282, 285; 361/18; 362/800
See application file for complete search history.

(56) References Cited

U.S. PATENT DOCUMENTS

| | | | | |
|---|---|---|---|---|
| 5,886,571 | A * | 3/1999 | Suwabe | G05F 3/247 327/541 |
| 2005/0195869 | A1* | 9/2005 | Kubota | H01S 5/042 372/38.02 |
| 2006/0044072 | A1* | 3/2006 | Kucharski | H01S 5/042 332/149 |
| 2007/0147849 | A1* | 6/2007 | Lee | H04B 10/801 398/198 |
| 2008/0224632 | A1* | 9/2008 | Noda | H05B 33/0812 315/291 |
| 2010/0164396 | A1* | 7/2010 | Lindeberg | H05B 33/0818 315/291 |

(Continued)

FOREIGN PATENT DOCUMENTS

CN 101483951 B 7/2012

OTHER PUBLICATIONS

Kwon et al., "LED Backlight Driving Circuits and Dimming Method", Journal of Information Display, vol. 11, No. 4, Dec. 2010, 9 pages.

(Continued)

*Primary Examiner* — Alexander H Taningco
*Assistant Examiner* — Kurtis R Bahr
(74) *Attorney, Agent, or Firm* — Sheridan Ross P.C.

(57) ABSTRACT

Various embodiments of a light source driver are disclosed. In one embodiment, the light source driver may have a driving transistor coupled directly to at least one light source without having additional switches such that the light source driver may be operated with a low voltage supply. Optionally, the light source drivers may have a bypassing circuit configured to reduce power consumption, and peaking current generator configured to speed up the turn on time of the at least one light source. At least some of the circuits, and block diagrams disclosed herein may be implemented using conventional CMOS design and manufacturing techniques and processes to provide, for example, at least one or more integrated circuits.

20 Claims, 13 Drawing Sheets

(56) References Cited

U.S. PATENT DOCUMENTS

| | | | |
|---|---|---|---|
| 2011/0095745 A1* | 4/2011 | Noda | G05F 1/565 |
| | | | 323/315 |
| 2013/0057175 A1 | 3/2013 | Chuang et al. | |
| 2013/0088157 A1* | 4/2013 | Noda | G05F 3/24 |
| | | | 315/173 |
| 2013/0222724 A1* | 8/2013 | Ueda | G09G 3/3655 |
| | | | 349/42 |
| 2015/0163869 A1* | 6/2015 | Yu | H05B 33/0806 |
| | | | 315/191 |

OTHER PUBLICATIONS

Schweber, Bill, "Power Supply and Topology Solutions for Driving LED Arrays", available at http://www.digikey.com/en/articles/techzone/2014/feb/power-supply-and-topology-solutions-for-driving-led-arrays, Digi-Key Corporation, 3 pages.

\* cited by examiner

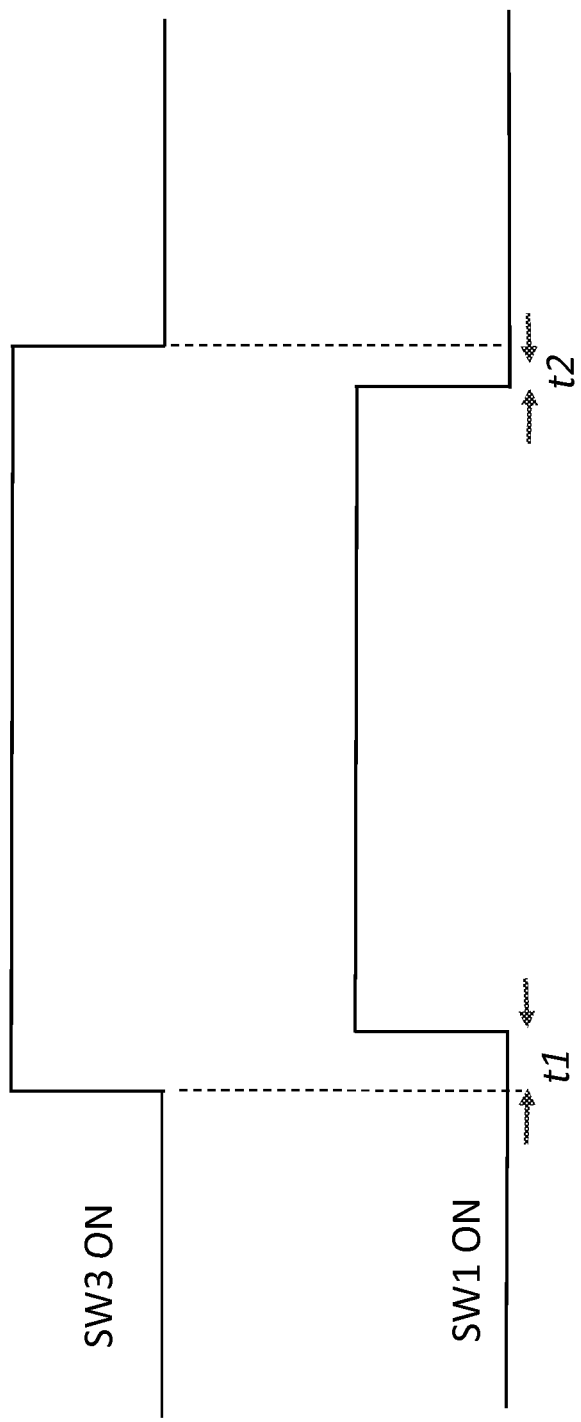

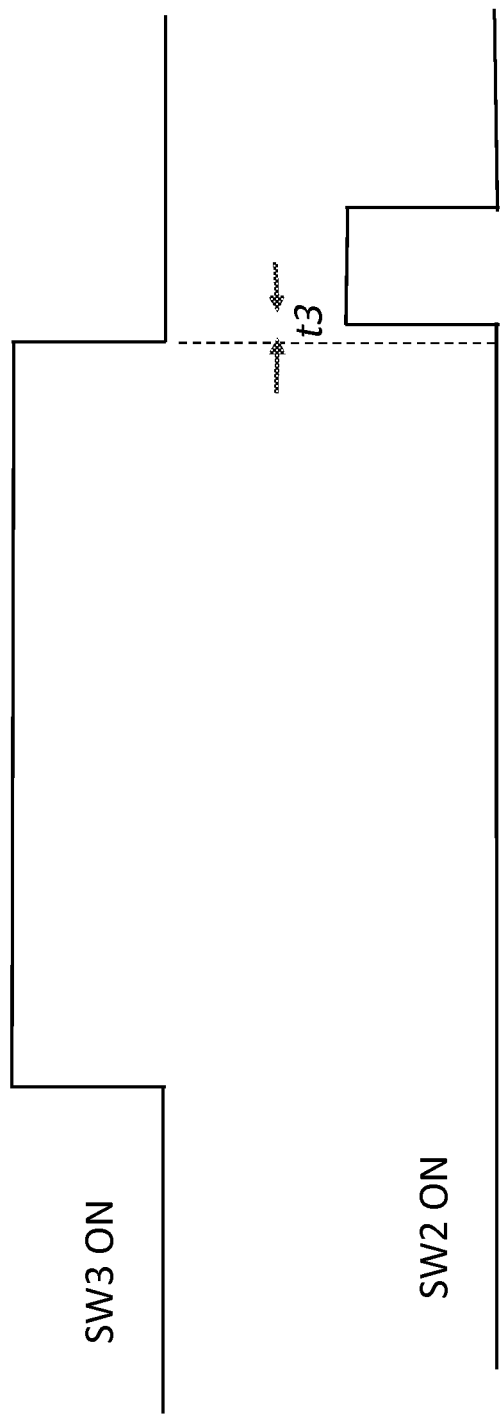

CIRCUMVENTING THE DRIVING CURRENT DRIVING THE AT LEAST ONE LIGHT SOURCE TO A BYPASSING CIRCUIT ARRANGED IN PARALLEL TO THE AT LEAST ONE LIGHT SOURCE ⟵ 650

SWITCHING ON AN ADDITIONAL BIASING CURRENT TO THE DRIVING TRANSISTOR SO AS TO REDUCE THE DRIVING CURRENT ⟵ 660

FIG. 6B

PROVIDING A PEAKING CURRENT TO THE AT LEAST ONE LIGHT SOURCE FOR A PREDETERMINED PERIOD OF TIME WHEN THE AT LEAST ONE LIGHT SOURCE IS TURNED ON ⟵ 670

FIG. 6C

LIGHT SOURCE DRIVER

FIELD OF THE INVENTION

Various embodiments of the inventions described herein relate to the field of a light source driver, and methods associated therewith.

BACKGROUND

A light-emitting diode (referred to hereinafter as LED) represents one of the most popular light-emitting devices today. In recent years, the luminous efficacy of LEDs, defined in lumens per Watt, has increased significantly. LEDs are popularly used in many electronic devices, particularly handheld devices due to the power efficiency. Generally, LEDs are driven by light source drivers configured to provide a constant current such that the light emitted by the LEDs are consistent in terms of brightness and color. LEDs are generally driven using pulse width modulation scheme where the current are turned off by a switch. When the switch is turned on, the current flowing through the switch would be required be substantially consistent. Switches are usually implemented using MOS transistors that require build in potential. Generally, a power supply to a light source driver is required to have a voltage supply higher than all the build in potentials of those in the light sources and the switches.

In addition, as with other electronic devices, any light source driver may be susceptible to channel length modulation that is caused by fluctuations or variations in power supply. For example, operating voltage across a light source driver may drop when all the switches are turned on as a sudden increase in current is drawn from the power supply. The channel length modulation may cause abrupt changes in brightness and color. From the application perspective where color and brightness uniformity are highly sought after, the channel length modulation cancellation may be a feature that a light source drivers should have.

Similar to the requirements in all other portable devices, light source drivers are required to have as low power consumption as possible. For this reason, it may be desirable to operate LEDs at low voltage. However, this may be a challenge because LEDs and controlling switches may have built-in potentials. There may be a limitation as to whether how low the operating voltage can be reduced. To make the matter worse, LEDs may be required to be turned on fast so as to transmit signals at tens or even hundreds of mega hertz.

What is needed is a driver that can be operated under low voltage with high speed. Such light source driver may be used to drive not only LEDs, but also other light sources.

BRIEF DESCRIPTION OF THE DRAWINGS

Different aspects of the various embodiments of the invention will become apparent from the following specification, drawings and claims in which:

FIG. 3B illustrates a timing diagram how the switches in FIG. 3A are controlled;

FIG. 4B illustrates a timing diagram showing how the switches in FIG. 4A are controlled;

FIG. 6B illustrates optional steps to improve power consumption for the method shown in FIG. 6A; and FIG. 6C illustrates an optional step to improve switching speed for the method shown in FIG. 6A.

The drawings are not necessarily to scale, and are drawn for illustration purpose only. Like numbers may, but not necessary, refer to like parts throughout the drawings, unless otherwise noted.

DETAILED DESCRIPTIONS OF SOME EMBODIMENTS

Figure 1:
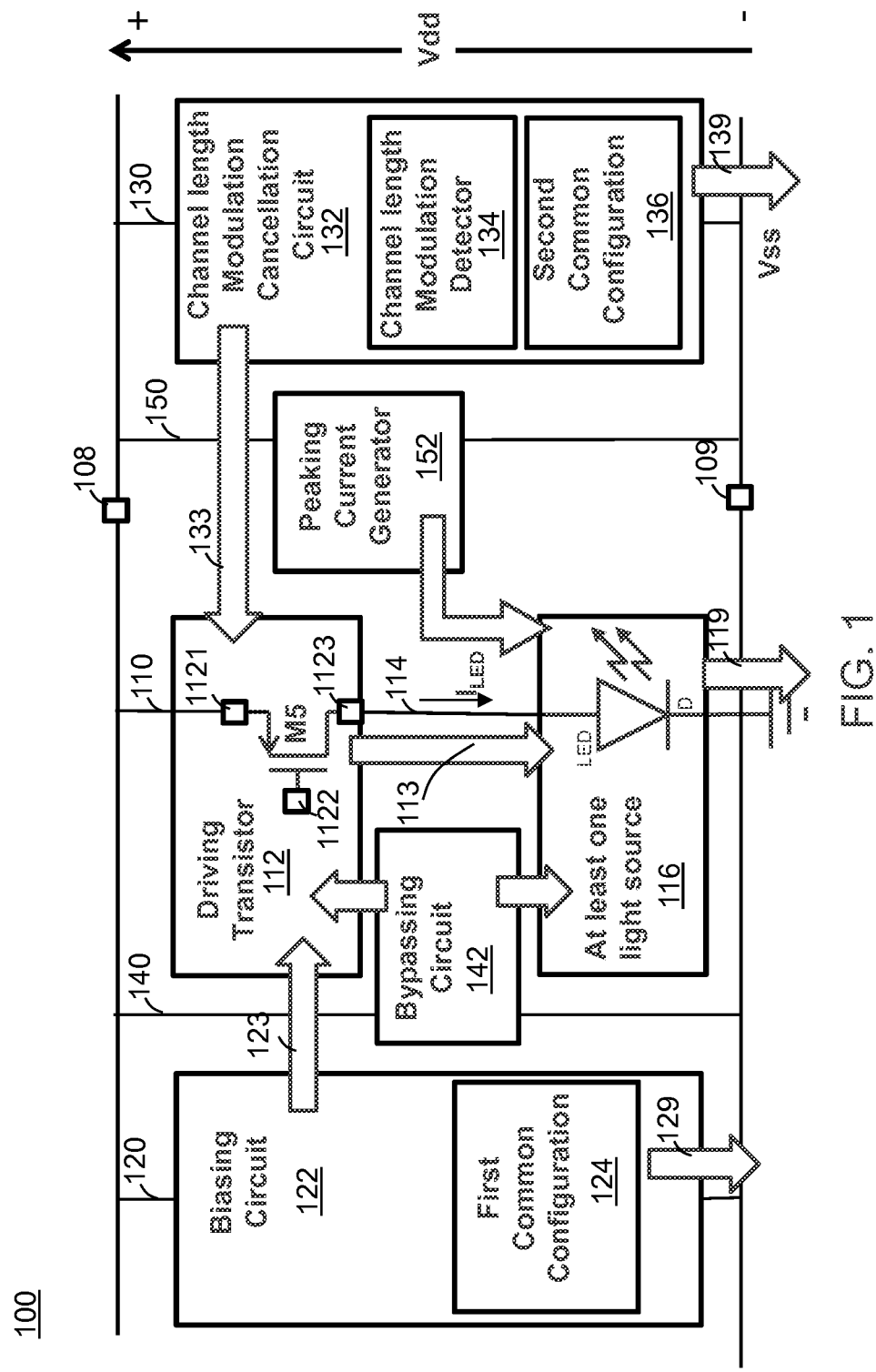
FIG. 1 illustrates a block diagram of a light source driver.

FIG. 1 illustrates a block diagram of a light source driver 100. The light source driver 100 may be configured to drive an LED or other types of light sources. The light source driver 100 may comprise a power terminal 108, a ground terminal 109, a first circuit branch 110 and a second circuit branch 130 coupled between the power terminal 108 and the ground terminal 109 in parallel. Optionally, the light source driver 100 may comprise a third circuit branch 120 coupled between the power terminal 108 and the ground terminal 109 in parallel with the first circuit branch 110 and the second circuit branch 120.

The first circuit branch 110 may comprise at least one light source 116 and a driving transistor 112 connected directly to the at least one light source 116. The driving transistor 112 may be connected directly to one of the power terminal 108 and the ground terminal 109. The at least one light source 116 may be connected directly to the other one of the power terminal 108 and the ground terminal 109. For example, when the driving transistor 112 comprises a P-type MOS transistor, the driving transistor 112 may be connected directly to the power terminal 108 whereas the at least one light source 116 may be coupled to the ground terminal 109. Similarly, in another embodiment when the driving transistor 112 comprises an N-type MOS transistor, the driving transistor 112 may be connected directly to the ground terminal 109 whereas the at least one light source 116 may be coupled to the power terminal 108.

The driving transistor 112 may comprise a gate terminal 1122, a source terminal 1121, and a drain terminal 1123. The terminology may be applicable to driving transistors 112 made using a CMOS technology. For a bipolar technology, the driving transistor 112 may comprise a base terminal 1122, a source terminal 1121 and an emitter terminal 1123 accordingly. The driving transistor 112 may comprise a plurality of transistors (not shown) coupled in parallel arrangement. The gate terminal 1122 may be configured to receive a control signal 123 that may determine the drive current 113 in node 114, as well as the current 119 that flows through the at least one light source 116. The control signal 123 may be coupled directly or indirectly to a feedback signal 133 that is indicative of modulation cancellation feedback control. The source terminal 1121 may be coupled directly to one of the power terminal 108 and the ground terminal 109. The drain terminal 1123 may be connected directly to the at least one light source 116.

The first circuit branch 110 may comprise additional light sources (not shown) coupled in series in addition to the at least one light source 116. The at least one light source 116 and the driving transistor 112 may be configured to operate under an operating voltage Vdd that may be applied between the power terminal 108 and the ground terminal 109. As each of the additional light sources (not shown) added in series may have build in potential, adding more light sources 116 in series may required higher operating voltage Vdd at the power terminal 108. In another embodiment, the additional light sources (not shown) may be added in parallel by mirroring the driving transistor 112 so as to connect to the additional light sources (not shown).

The second circuit branch 130 may comprise a channel length modulation cancellation circuit 132 coupled directly (e.g., without any intermediary devices therebetween) or indirectly between the power terminal 108 and the ground terminal 109 in parallel to the first circuit branch 110. The channel length modulation cancellation circuit 132 may be configured to generate the feedback signal 133 indicative of respective compensations needed in accordance with fluctuations in voltage difference across the power terminal 108 and the ground terminal 109 to the first circuit branch 110.

Generally, the light source driver 100 may comprise a third circuit branch 120 having a biasing circuit 122 configured to generate reference voltage signals and reference current signals required to operate the driving transistor 112. The biasing circuit 122 may be coupled to the power terminal 108 and the ground terminal 109 in parallel to the first circuit branch 110 and the second circuit branch 130. In addition to the driving transistor 112, the biasing circuit 122 may be coupled to the channel length modulation cancellation circuit 132.

The biasing circuit 122 may comprise a first common configuration portion 124. The first common configuration portion 124 may comprise current mirrors and other building blocks. The channel length modulation cancellation circuit 132 may comprise a second common configuration portion 136 substantially similar to the first common configuration portion 124 of the biasing circuit 122. In one embodiment, the first common configuration portion 124 of the biasing circuit 122, and the second common configuration portion 136 of the channel length modulation cancellation circuit 132 may comprise substantially similar components arranged in a substantially similar orientation. By having such arrangement, the effect of the channel length modulation on the third circuit branch 120, and the effect of the channel length modulation cancellation on the second circuit branch 130 may be substantially similar. Similarly, the effect of the channel length modulation incurred on the first circuit branch 110 may be made similar by having another portion (not shown) of circuit substantially similar to the first common configuration portion 124 or the second common configuration portion 136.

More specifically, the second common configuration portion 136 of the channel length modulation cancellation circuit 132 may be a substantially fixed current biasing portion configured to maintain a substantially fixed biasing current 139 in the second branch 130, and a channel length modulation detector 134 configured to generate the feedback signal 133. All other branches may have a substantially similar circuit configuration that is similar to the substantially fixed current biasing portion so as to have substantially similar fixed biasing current. For example, the third circuit branch 120 where the biasing circuit 122 is provided may have the first common configuration portion 124 that is configured to provide a biasing current 129. The biasing current 129 may be substantially similar to the substantially fixed biasing current 139. The biasing current 129 and the substantially fixed biasing current 139 may be "mirrored" using current mirror circuits. For avoidance of doubt, mirroring a particular current may mean that the particular current being replicated in the exact same amount or being replicated in N number, where N is an integer value greater than or equal to one, of times larger the amount of the particular current. For this reason, in some embodiments, the ratio of the biasing current 129 and the substantially fixed biasing current 139 may be an integer number.

The channel length modulation detector 134 may comprise a resistor configured to detect channel length modulation. The second common configuration portion 136 may be configured to maintain substantially similar operating voltage and operating current. As shown in FIG. 1, the voltage across the power terminal 108 and the ground terminal 109 is represented by Vdd. When Vdd increases, the voltage across the channel length modulation detector 134 may increase in accordance with the channel length modulation or the fluctuation in Vdd. The voltage change of the channel length modulation detector 134 may be detected and may be provided as feedback to the first circuit branch 110 or the third circuit branch 120 so as to substantially cancel the channel length modulation.

The driving transistor 112 may be configured to provide a current $I_{LED}$ to the at least one light source 116. In many prior art, a switch (not shown) may be inserted into the first circuit branch 110, for example, between the at least one light source 116 and the driving transistor 112, so as to cut off the current when the at least one light source 116 is to be turned off. However, the light source driver 110 shown in FIG. 1 is void of such switches in the first circuit branch 110. The switch (not shown) in the first circuit branch 110 may mean additional built in potential and may limit how low the operating voltage (Vdd) can be. One advantage of the arrangement shown in FIG. 1 may be that the first circuit branch 110 may have only two devices. This arrangement may reduce build in potential in the first circuit branch 110, which in turn, enable a user to lower further the operating voltage (Vdd).

In order to completely shut down the current, the light source driver 100 may further comprise a bypassing circuit 142 having a first switch 342 (See FIG. 3A) configured to bypass electric current $I_{LED}$ from the at least one light source 116. The bypassing circuit 142 may comprise a second switch 344 (See FIG. 3A) coupled to the driving transistor 112 so as to reduce the current $I_{LED}$ flowing through the at least one light source 116. When the second switch 344 is activated, the driving transistor 112 may be configured to reduce the current $I_{LED}$ flowing in the first circuit branch 110 and thus, reducing power consumption when the at least one light source 116 is turned off. The bypassing circuit 142 may be advantageous for providing ability to turn off the at least one light source 116 with low power consumption, without requiring higher operating voltage.

To speed up the turn-on time or the turn-off time, the light source driver 100 may further comprise a peaking current generator 152. The peaking current generator 152 may be configured to generate an additional driving current to the at least one light source 116 for a predetermined time period when the at least one light source 116 is turned on, or may be configured to generate an additional discharge current to bypass current from the node 114 so that the at least one light source 116 can be turned off at faster rate compared to a light source driver 100 without such peaking current generators 152.

Figure 2A:
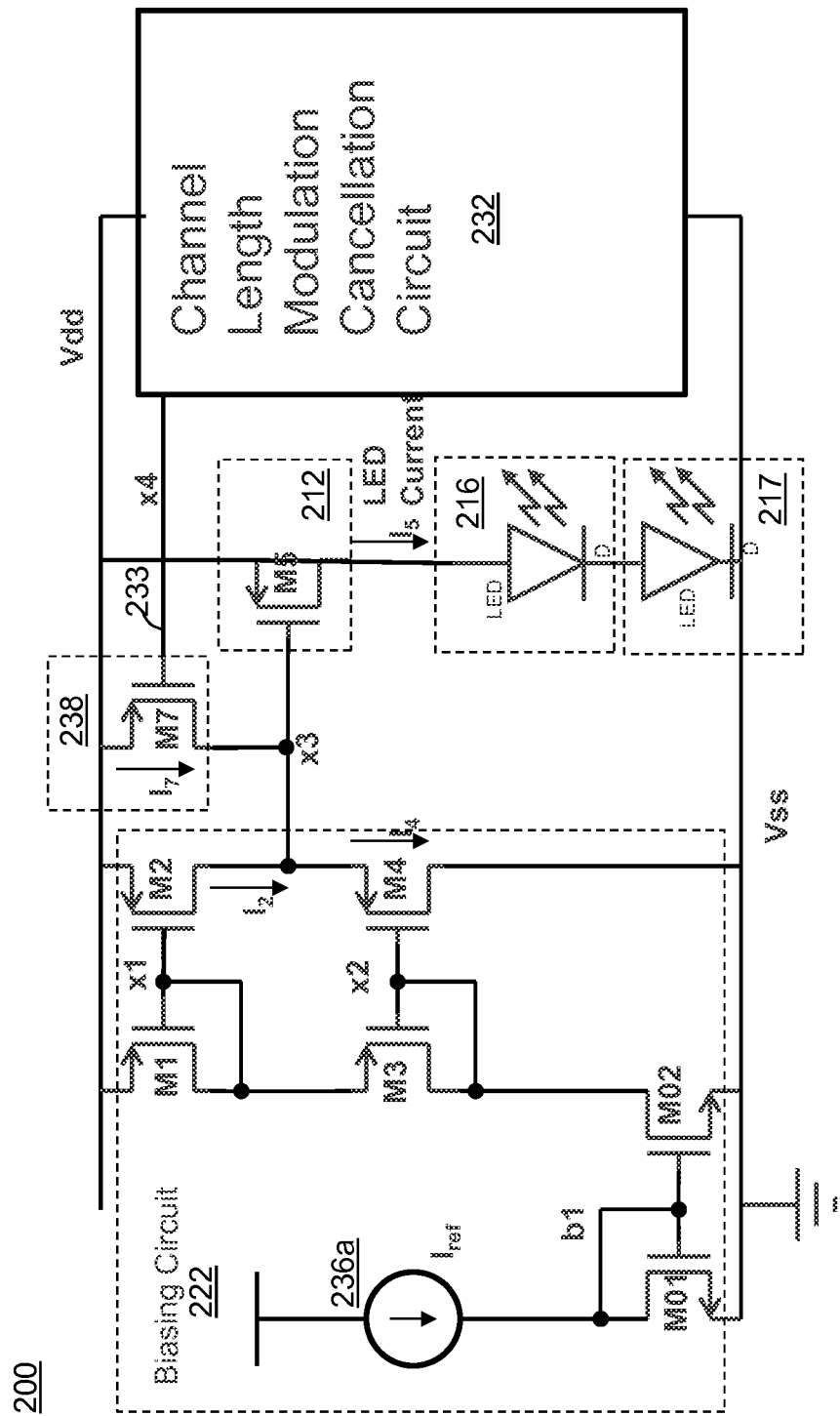
FIG. 2A illustrates a circuit diagram of one embodiment of a light source driver for low voltage sources.

FIG. 1 shows a block diagram illustrating various building blocks of the light source driver 100. More details circuit implementation, and various implementation considerations will be illustrated in subsequent drawings. For example, FIG. 2A illustrates a circuit diagram of one embodiment of a light source driver 200 for low voltage sources. The light source driver 200 may comprise a biasing circuit 222, a driving transistor 212, at least one light source 216, and a channel length modulation cancellation circuit 232. The light source driver 200 may further comprise additional optional light sources coupled in series to the at least one light source 216 such as the light source 217 shown in FIG. 2A. The biasing circuit 222 may comprise a current source 236a, and current mirrors formed using M01-M02, M1-M2 and M3-M4. The current mirrors may be configured to generate a LED driving current $I_5$.

The current source 236a may be made using a band gap voltage generator so as to generate a constant reference current $I_{ref}$ that may be substantially independent from process and temperature variations. The constant reference current $I_{ref}$ may be replicated in the biasing circuit 222 to a first biasing current $I_2$ and a second biasing current $I_4$. Under normal operating condition, the first biasing current $I_2$ and the second biasing current $I_4$ may be substantially similar. However, for example, when the operating voltage Vdd increases, the first biasing current $I_2$ and the second biasing current $I_4$ may differ and the operating voltage of the node x3 may change. The change may be substantially offset by the current $I_7$ generated by the transistor M7 that is controlled by the channel length modulation cancellation circuit 232. In this way, the LED driving current $I_5$ may remain substantially constant in spite of variations in operating voltage. In this way, the effect caused by the channel length modulation may be minimal.

Figure 2B:
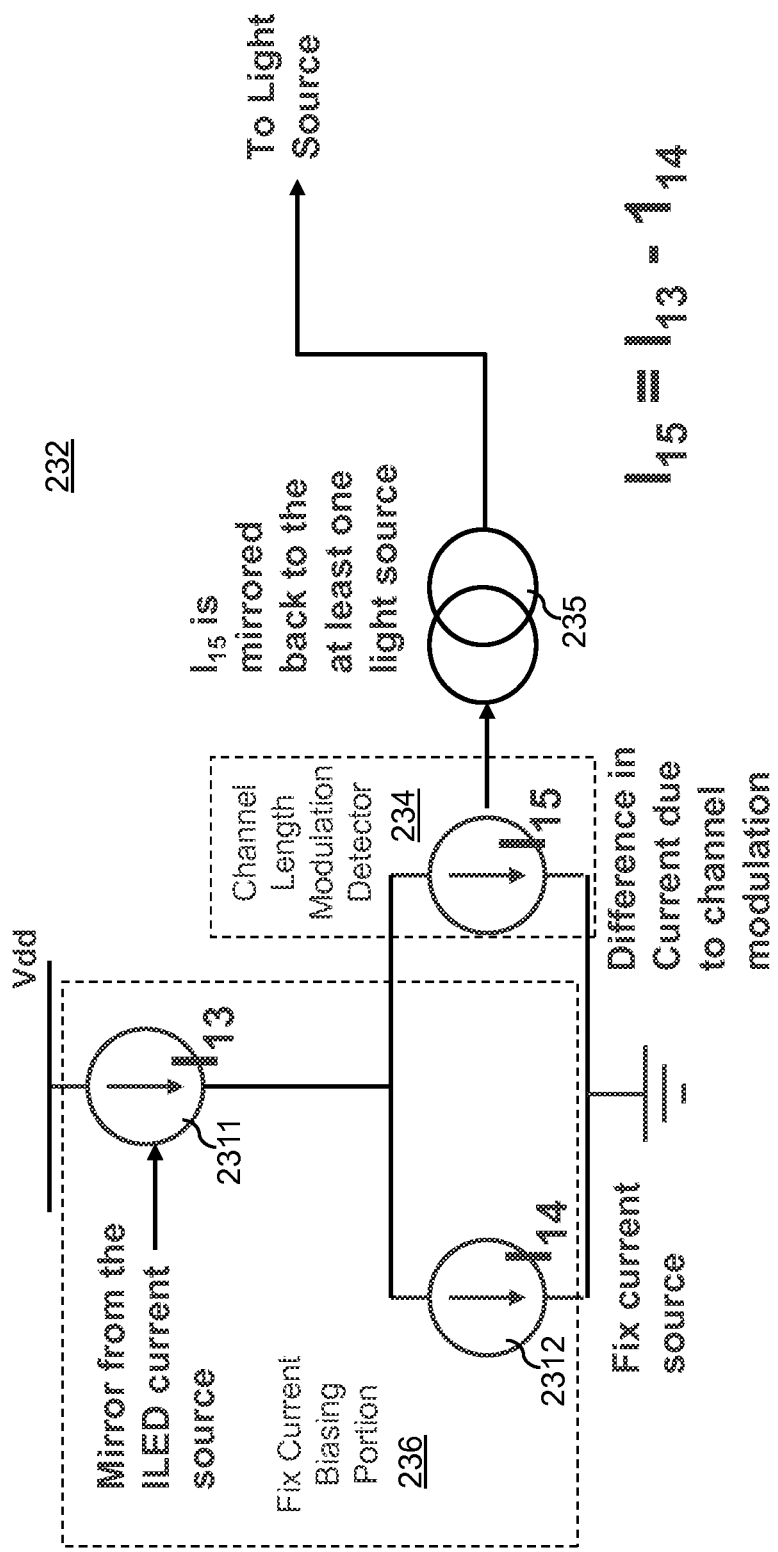
FIG. 2B illustrates a conceptual block diagram of the channel length modulation cancellation circuit.

FIG. 2B illustrates a conceptual block diagram of the channel length modulation cancellation circuit 232. Generally, the channel length modulation cancellation circuit 232 comprises a mirrored current source 2311 with operating current $I_{13}$ that is configured to mirror the constant reference current $I_{ref}$ (see FIG. 2A), a fixed current source 2312 and a channel length modulation detector 234. The fixed current source 2312 having an operating current $I_{14}$, and the channel length modulation detector 234 having an operating current $I_{15}$ may be connected in parallel arrangement to each other. However, the fixed current source 2312 and the channel length modulation detector 234 may be connected in series to the mirrored current source 2311. The operating current $I_{13}$ of the mirrored current source 2311 may be substantially equal to the sum of the operating current $I_{14}$ of the fixed current source 2312, and the operating current $I_{15}$ of the channel length modulation detector 234. With this configuration, when Vdd increases or decreases, the operating current $I_{15}$ of the channel length modulation detector 234 may increase or decrease accordingly. The changes in the operating $I_{15}$ of the channel length modulation detector 234 may be mirrored back to the at least one light source 216 using current mirrors (not shown). It should be appreciated that the current mirrors may be implemented using any type of known technology, such as having two similar sized transistors with the respective gate terminals coupled to a common voltage signal.

Figure 2C:
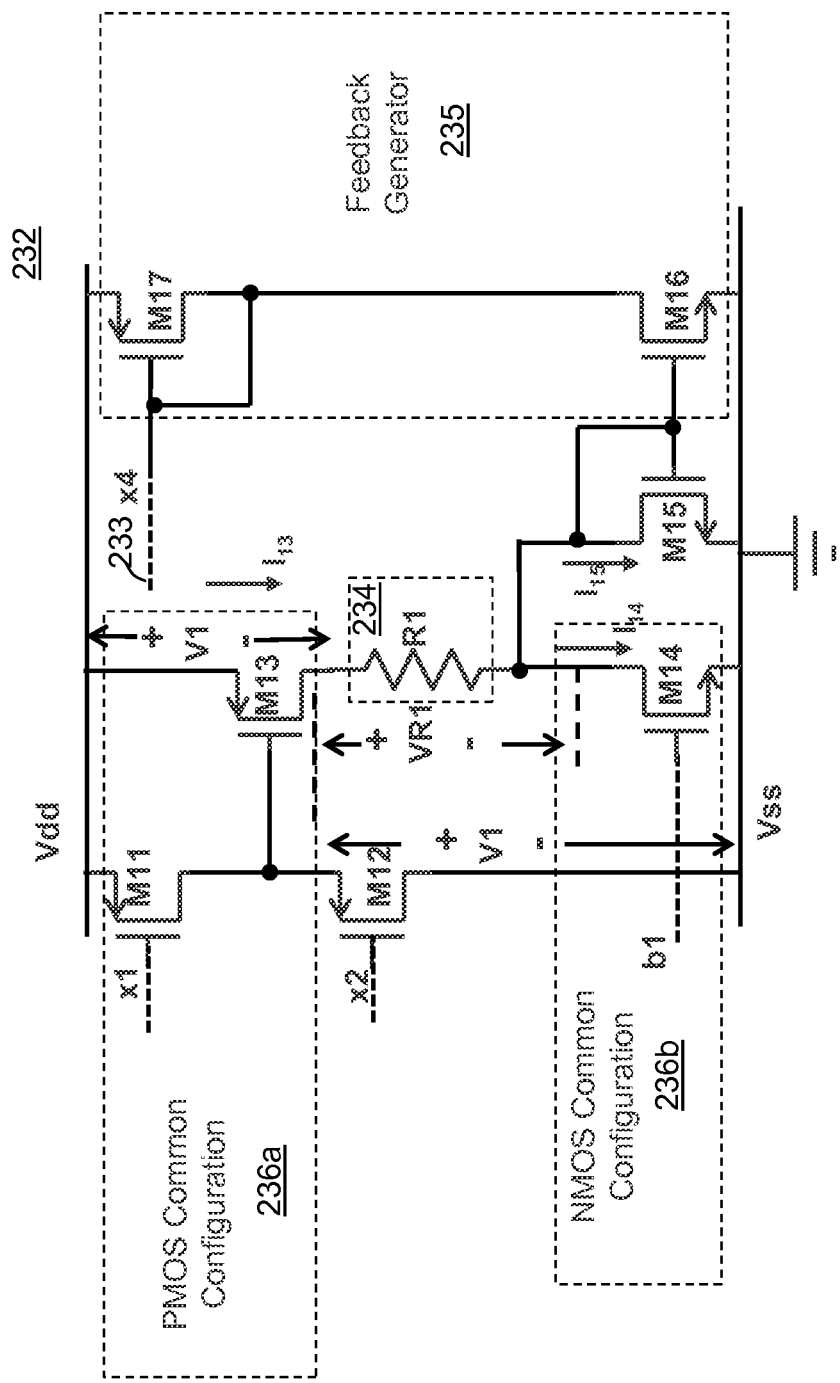
FIG. 2C illustrates a circuit diagram of the channel length modulation cancellation circuit.

As understood by one with ordinary skill in the art, a current source may be implemented using transistors. One circuit implementation of the channel length modulation cancellation circuit 232 shown in FIG. 2B is illustrated in FIG. 2C. As shown in FIG. 2C, the channel length modulation cancellation circuit 232 may comprise a PMOS common configuration portion 236a and a NMOS common configuration portion 236b. The PMOS common configuration portion 236a may be a building blocked configured to generate the operating current $I_{13}$. The operating current $I_{13}$ may mirror the constant reference current $I_{ref}$. For avoidance of doubt, mirroring a particular current may mean that the particular current being replicated in exact same amount or being replicated in N number of times larger the amount of the particular current. For this reason, the biasing circuit 222 may comprise a circuit substantially similar to the PMOS configuration portion 236a.

The NMOS common configuration portion 236b may be configured to generate the operating current $I_{14}$ of the fixed current source 2312 shown in FIG. 2B. The biasing circuit 222 may have a circuit substantially similar to the NMOS common configuration portion 236b. The channel length modulation detector 234 may comprise a resistor, R1. When the operating voltage Vdd changes, the operating current $I_{14}$ of the fixed current source 2312 may remain constant, and as a result, voltage drop across the resistor VR1 may change, resulting in the current flow through the current mirror M15 changes. The changes may then feedback through a feedback generator 235 comprising transistors M16 and M17. Referring to FIG. 2A and FIG. 2C, the feedback generator 235 may be configured to generate a feedback signal 233 to the driving transistor 212 via a feedback transistor 238.

Figure 2D:
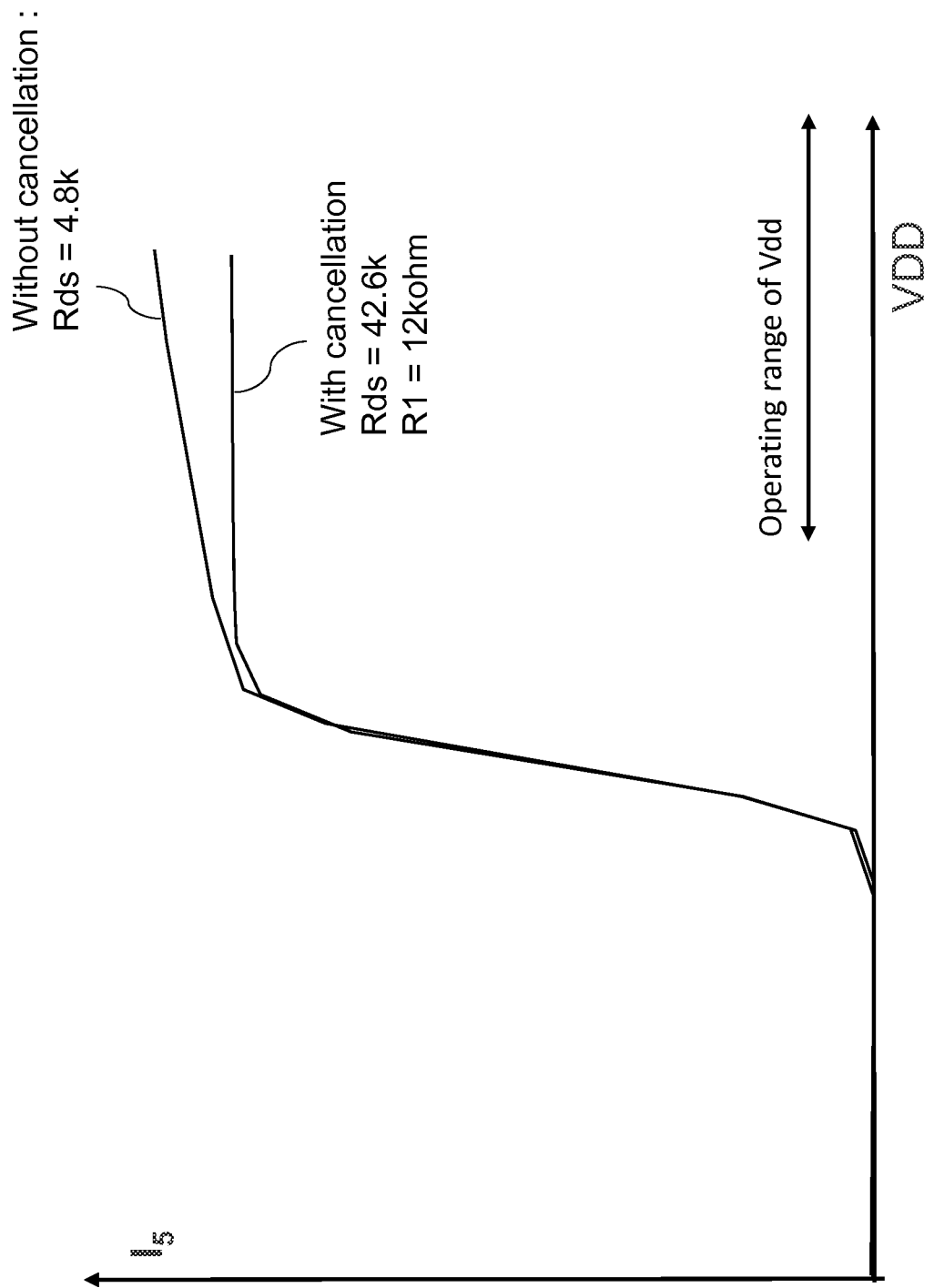
FIG. 2D illustrates a simulation result comparing a conventional driver with the light source driver shown in FIG. 2A.

FIG. 2D illustrates a simulation result comparing a conventional driver with the light source driver shown in FIG. 2A. As shown in FIG. 2D, without the channel length modulation cancellation circuit 232, the current flowing through the at least one light source 216, also referred as the LED current $I_5$ may increase when the Vdd increases. The effective resistance value (obtained by dividing voltage and current) across driving transistor 212 may be 4.8 k without the channel length modulation cancellation circuit 232. However, with the channel length modulation cancellation circuit 232, the LED current $I_5$ may remain substantially flat regardless of the value of Vdd in the operating range. In the embodiment shown in FIG. 2D, the channel length modulation detector 234 may be a resistor having a resistance value of 12 kOhm. The effective resistance value across the driving transistor 212 may increase to 42.6 kohm by applying the channel length modulation cancellation circuit 232. In this embodiment, the effective resistance of the driving transistor 212 may increase by approximately more than 9 times.

Figure 2F:
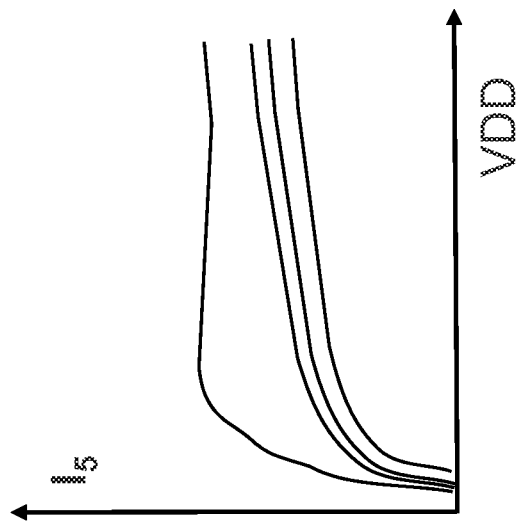
FIG. 2F shows a magnified version of the highlighted portion of graph shown in FIG. 2E.
Figure 2E:
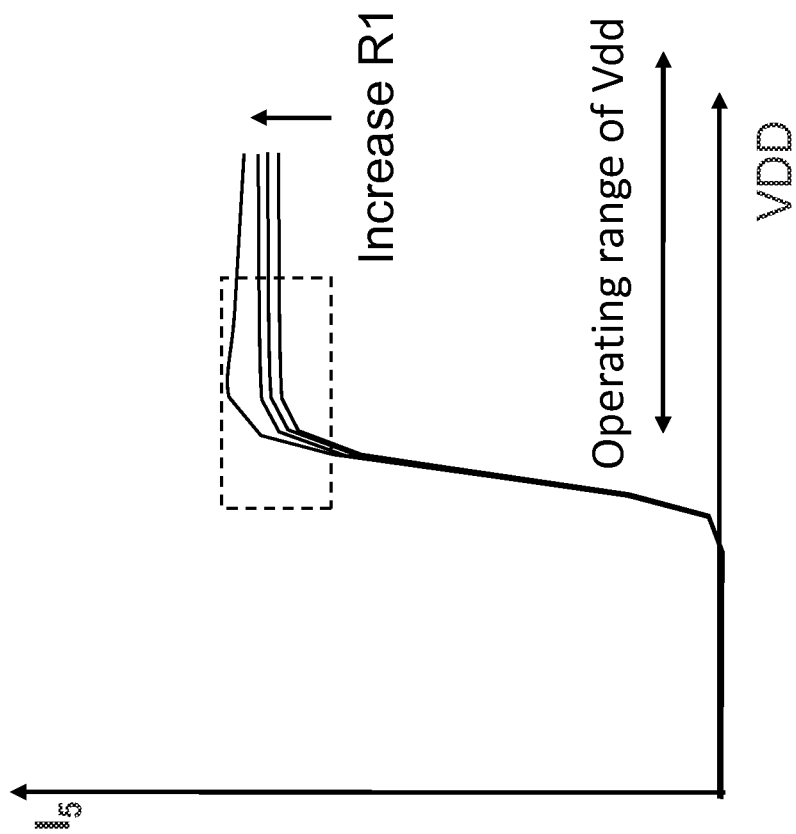
FIG. 2E illustrates a simulation result showing the effect of resistance, R1.

FIG. 2E illustrates a simulation result showing the impact of selection of the resistance, R1 of the channel length modulation detector 234. A magnified version of the highlighted portion in FIG. 2E is shown in FIG. 2F. As shown in FIG. 2E, the LED current $I_5$ may remain substantially flat in the operating range of Vdd even though the value of R1 changes. As shown in FIG. 2F, the gradient of the current-voltage plot may remain substantially similar. When the resistance is too high, over compensation may happen. However, for a selected value of the resistance value, even with process and temperature variation of the value of R1, the simulation result show that the channel length modulation may be substantially canceled.

Figure 3A:
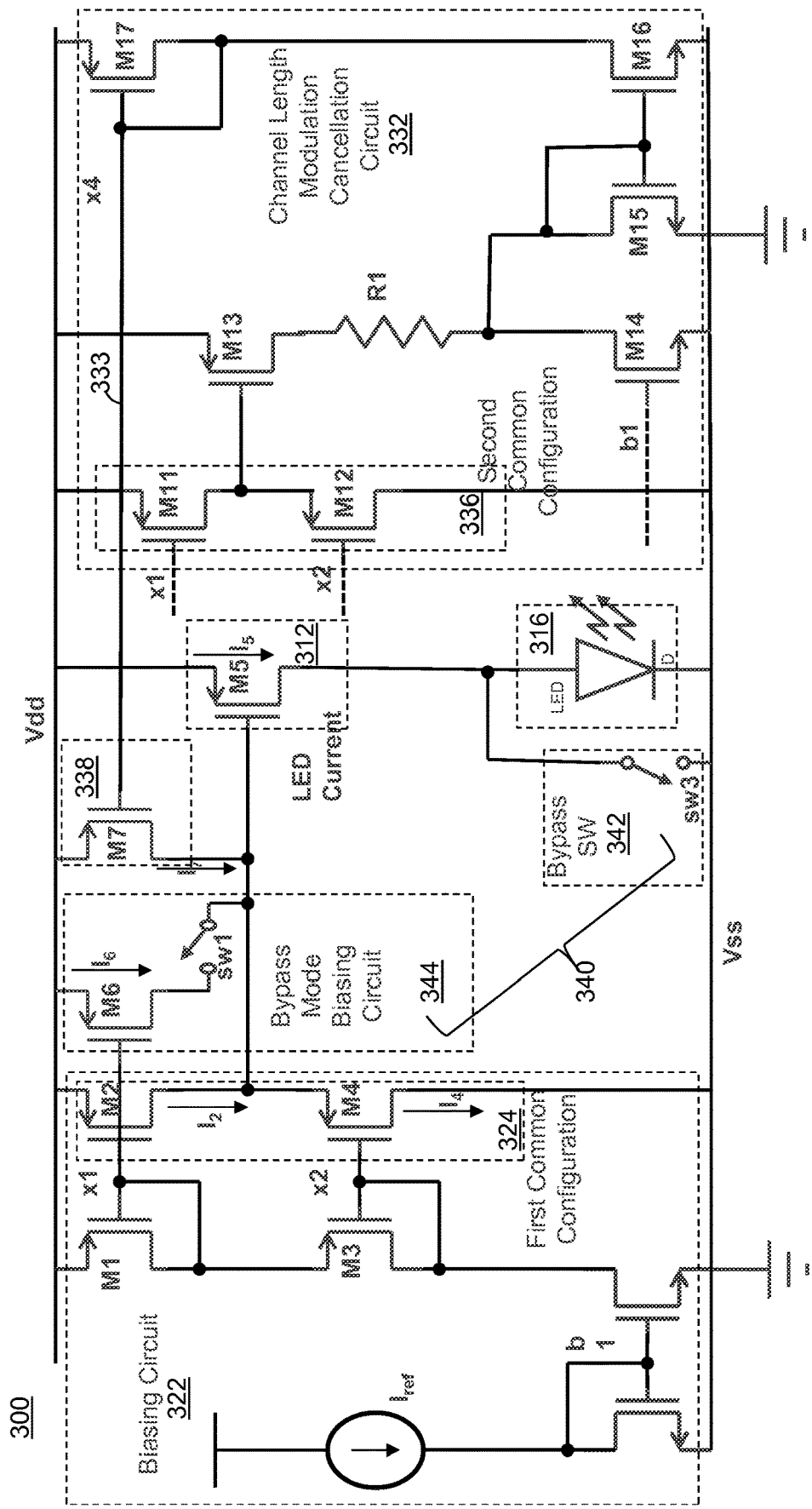
FIG. 3A illustrates a circuit diagram of one embodiment of a light source driver with improved power consumption.

FIG. 3A illustrates a circuit diagram of one embodiment of a light source driver 300 with improved power consumption. The light source driver 300 may comprise a biasing circuit 322, a driving transistor 312, at least one light source 316, a bypass switch 342, a bypass mode biasing circuit 344 and a channel length modulation cancellation circuit 332. The driving transistor 312 may be configured to generate a light source current $I_5$ to the at least one light source 316. The light source driver 300 may be substantially similar to the light source driver 200. For example, the biasing circuit 322 has a first common configuration portion 324 that may be substantially similar to the second common configuration portion 336 of the channel length modulation cancellation circuit 332. In the embodiment shown in FIG. 3A, the operating condition of the transistors M2 and M4 may be substantially similar to the operating condition of the transistors M11 and M12. In this way, variations of the operating voltage Vdd may impose substantially similar channel length modulation effects on the transistors set of M2-M4, and the transistors set of M11-M12. As explained previously, the channel length modulation cancellation circuit 332 may be configured to generate a feedback signal 333. The feedback signal 333 may be feedback to the driving transistor 312 via the feedback transistor 338.

The light source driver 300 and the light source driver 200 may differ at least in that the light source driver 300 may comprise the bypassing circuits 340 having the bypass switch 342 and the bypass mode biasing circuit 344. FIG. 3B illustrates a timing diagram how the bypass switch 342 and a second switch in the bypass mode biasing circuit in FIG. 3A are controlled. Referring to FIG. 3A and FIG. 3B, when the at least one light source 316 is to be turned off, first, the bypass switch 342 may be activated so as to bypass electric current from the at least on light source 316. For example, the bypass switch 342 shown in FIG. 3A may be turned on and as a result, the electric current may be configured to go through the bypass switch 342 bypassing the at least one light source 316. The control signal sw3 of the bypass switch 342 may be configured to turn on by switching the signal from low to high.

The bypass mode biasing circuit 344 may be configured to reduce power consumption of the light source driver 300. For example, the switch signal sw1 of the bypass mode biasing circuit 344 may be activated so as to reduce the light source current $I_5$. For example, the bypass mode biasing circuit 344 may be configured to supply an additional current to the driving transistor 312 to reduce the light source current $I_5$. Specifically, when the switch sw1 is turned on, the gate of the driving transistor 312, a P-type transistor will increase, and the driving transistor 312 may reduce the light source current $I_5$ in response. In another embodiment where the driving transistor is not a P-type transistor, the bypass mode biasing circuit 344 may be configured to draw current away from the driving transistor 312 so as to reduce the light source current $I_5$.

In order to ensure that the light generated by the at least one light source 316 remain substantially constant, the light source current $I_5$ may not be affected by the operation of the bypass mode biasing circuit 344. This may be achieved by activating the bypass switch 342 first before any changes is to be applied by the bypass mode biasing circuit 344. As shown in FIG. 3B, the switch signal sw1 of the bypass mode biasing circuit 344 may be activated only when the switch signal sw3 of the bypass switch 342 is already activated. Specifically, the switch signal sw1 of the bypass mode biasing circuit 344 may be turned on approximately within a first predetermined amount of time t1 after the first switch is turned on. Similarly, the switch signal sw1 of the bypass mode biasing circuit 344 may be turned off within a second predetermined amount of time t2 before the first switch is turned off. Generally, each of the first and second predetermined amounts of time t1 and t2 may be less than 2 ns respectively. However, on some occasions where the power consumption has higher priority, each of the first and second predetermined amounts of time t1 and t2 may be less than 1 ns. The shorter the first and second predetermined amounts of time t1 and t2, the power consumption of the light source driver 300 may be lower.

Figure 4A:
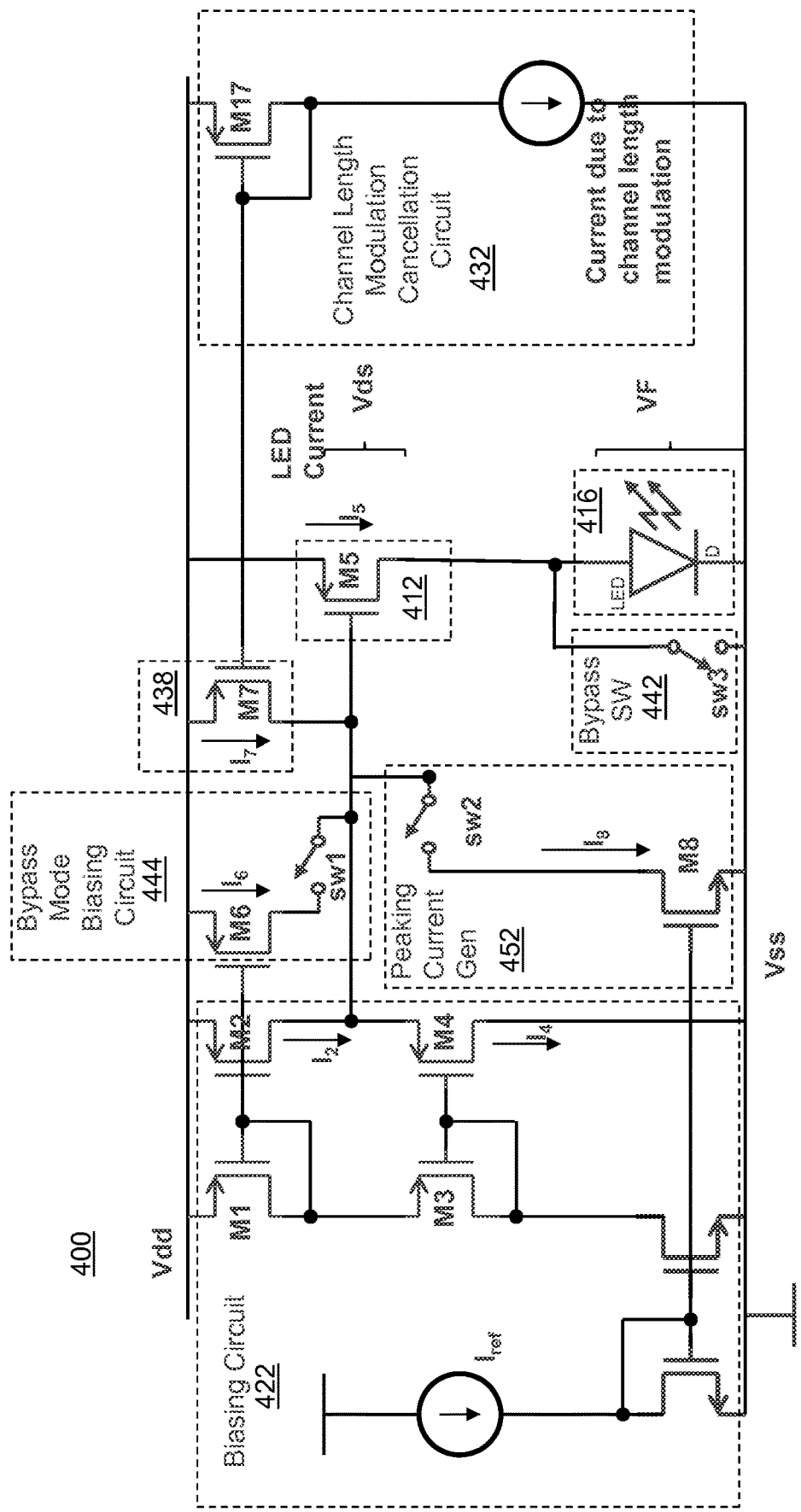
FIG. 4A illustrates a circuit diagram of one embodiment of a light source driver with improved turned on speed.

FIG. 4A illustrates a circuit diagram of one embodiment of a light source driver 400 with improved turned on speed. The light source driver 400 may comprise a biasing circuit 422, a driving transistor 412, at least one light source 416, a bypass switch 442, a bypass mode biasing circuit 444 and a channel length modulation cancellation circuit 432. The light source driver 400 may further comprise an optional bypass switch 442, an optional bypass mode biasing circuit 444. The light source driver 400 may be substantially similar to the light source driver 300 shown in FIG. 3A but differs at least in that the light source driver 400 comprises a peaking current generator 452. The peaking current generator 452 may be configured to speed up the turn on time of the at least one light source 416.

The peaking current generator 452 may be activated after the bypass switch 442 is turned off. FIG. 4B illustrates a timing diagram showing how the switches in FIG. 4A may be controlled. Referring to FIG. 4A and FIG. 4B, the switch sw2 provided in the peaking current generator 452 may be activated within a third predetermined amount of time t3 after the bypass switch 442 is inactivated or turned off. When the switch sw2 is activated, the peaking current generator 452 may be configured to provide an additional charging or an additional discharging current $I_8$ such that the driving transistor 412 is turned on faster. For example, the driving transistor 412 shown in FIG. 4A may be a P-type transistor, the additional discharging current $I_8$ may speed up the turn-on time of the driving transistor 412.

Figure 5:
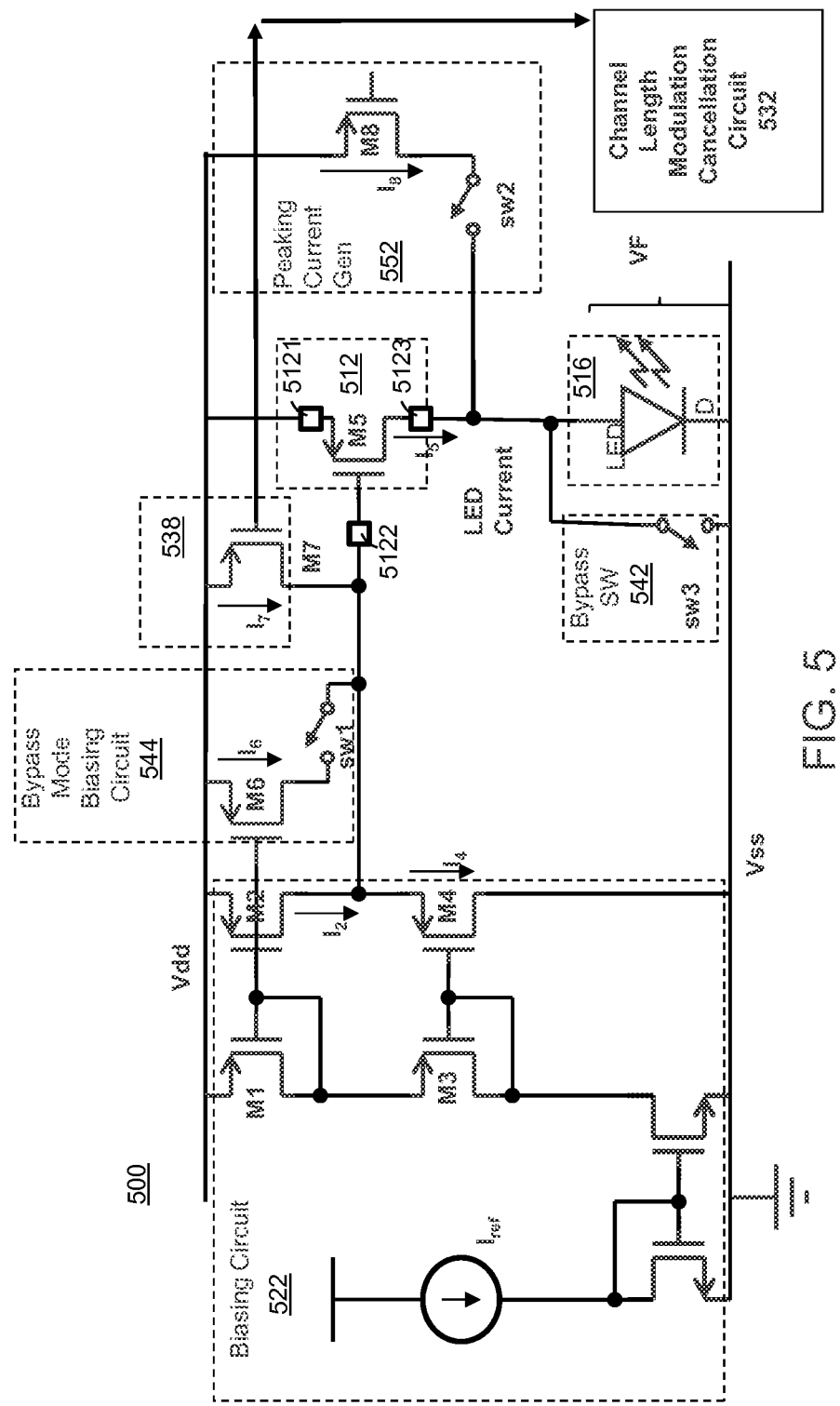
FIG. 5 illustrates a circuit diagram of one embodiment of a light source driver with improved turned on speed using a peaking current generator.

FIG. 5 illustrates a circuit diagram of one embodiment of a light source driver 500 with improved turned on speed. The light source driving 500 may be a driving apparatus configured to provide a drive current. The light source driver 500 may comprise a biasing circuit 522, a driving transistor 512, at least one light source 516, a bypass switch 542, a bypass mode biasing circuit 544 and a channel length modulation cancellation circuit 532. The light source driver 500 may further comprise an optional bypass switch 542, an optional bypass mode biasing circuit 544 and a peaking current generator 552. The driving transistor 512 may comprise a gate terminal 5122, a source terminal 5121 and a drain terminal 5123. The biasing circuit 522 may be coupled to the gate terminal 5122 of the driving transistor 512. The at least one light source 516 may be coupled to one of the source 5121 and drain terminals 5123. The channel length modulation cancellation circuit 532 may be configured to detect channel length modulation so as to provide a feedback signal indicative of the channel length modulation to the gate terminal 5122 of the driving transistor 512.

The light source driver 500 may be substantially similar to the light source driver 400 shown in FIG. 4A but differs at least in that the peaking current generator 552 of the light source driver 500 is coupled directly to the at least one light source 516 and not the driving transistor 512. The peaking current generator 552 may be configured to speed up the turn on time of the at least one light source 516. As shown in FIG. 5, the peaking current generator may be coupled to the at least one light source 516 directly so as to provide a charge-up current to the at least one light source for a predetermined time period. For example, the transistor M8 and the switch sw2 may be activated so as to provide an additional drive current $I_8$ to the at least one light source 516. However, the additional drive current $I_8$ may be turned off after start up. In the embodiment shown in FIG. 5, the additional drive current may be provided within less than 3 ns.

Figure 6A:
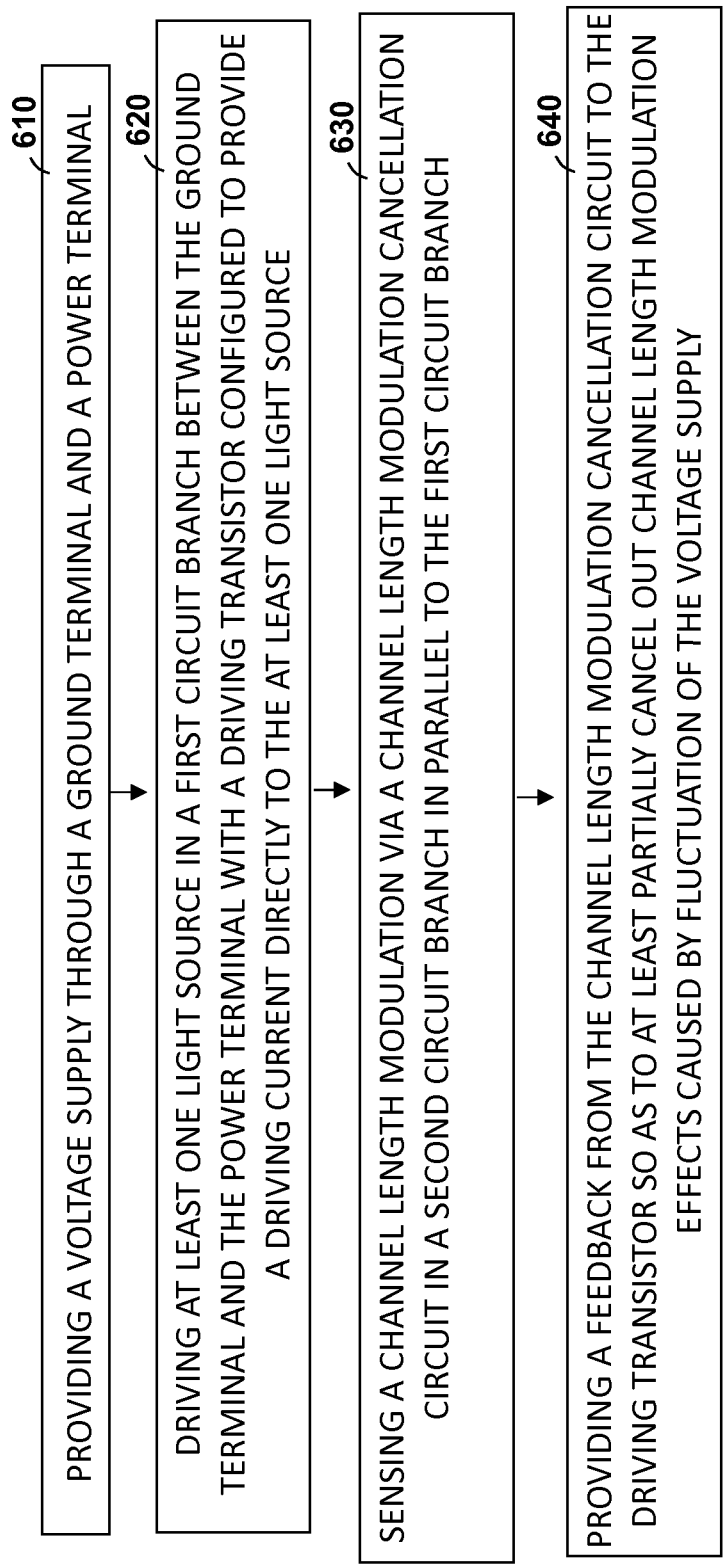
FIG. 6A illustrates a method for cancelling channel length modulation caused by fluctuation of supply voltage.

FIG. 6A illustrates a method 600 for cancelling channel length modulation caused by fluctuation of supply voltage. In step 610, a voltage supply may be provided through a ground terminal and a power terminal. Next, in step 620 at least one light source in a first circuit branch between the ground terminal and the power terminal may be driven with a driving transistor configured to provide a driving current directly to the at least one light source. The method then proceeds to step 630 in which a channel length modulation may be detected via a channel length modulation cancellation circuit in a second circuit branch arranged in parallel to the first circuit branch. In step 640, a feedback from the channel length modulation cancellation circuit may be provided to the driving transistor so as to at least partially cancel out channel length modulation effects caused by fluctuation of the voltage supply.

FIG. 6B illustrates optional steps to improve power consumption for the method shown in FIG. 6A. For example, the method 600 may further comprise step 650 and step 660. In step 650, the driving current driving the at least one light source may be circumvented to a bypassing circuit arranged in parallel to the at least one light source. Then in step 660, an additional biasing current may be turned on to the driving transistor so as to reduce the driving current. FIG. 6C illustrates a further optional step 670 to improve switching speed for the method shown in FIG. 6A. In step 670, a peaking current may be provided to the at least one light source for a predetermined period of time when the at least one light source is turned on.

Different aspects, embodiments or implementations may, but need not, yield one or more of the following advantages. For example, the peaking current generator 152, 452 and 552 may be beneficial in speeding up the turn on time of the at least one light source of 116, 416 and 416 respectively. The bypass switches and the timing controls illustrated in FIG. 3B and FIG. 4B may be critical in reducing power consumption and to ensure a consistent light output.

Although specific embodiments of the invention have been described and illustrated herein above, the invention should not be limited to any specific forms or arrangements of parts so described and illustrated. For example, all the embodiments described herein are MOS transistors. The teaching in the specification above may be applicable to bipolar or other types of transistor. When a singular form, such as "a" and "an", is used, the teaching may be applicable to plural form. As another example, when a N-type transistor is illustrated, the teaching may be applicable to another embodiment where a P-type transistor is used. The scope of the invention is to be defined by the claims appended hereto and their equivalents.

I claim:

1. A light source driver, comprising:
a power terminal and a ground terminal;
a first circuit branch having at least one light source and a driving transistor connected directly to the at least one light source, the first circuit branch coupled between the power terminal and the ground terminal;
a second circuit branch having a channel length modulation cancellation circuit coupled between the power and ground terminals in parallel to the first circuit branch, the channel length modulation cancellation circuit being configured to generate a feedback signal indicative of fluctuations in a voltage difference across the power terminal and the ground terminal to the first circuit branch, wherein the feedback signal is provided to a gate terminal of the driving transistor; and
a biasing circuit coupled to the driving transistor and the channel length modulation cancellation circuit.

2. The light source driver of claim 1, wherein the driving transistor is connected directly to one of the ground terminal and the power terminal.

3. The light source driver of claim 1, wherein the at least one light source is connected directly to the ground terminal.

4. The light source driver of claim 1, wherein the driving transistor is configured to provide a driving current to the at least one light source, and wherein the light source driver comprises a bypassing circuit having a first switch configured to circumvent the driving current away from the at least one light source.

5. The light source driver of claim 4, wherein the bypassing circuit comprises a second switch coupled to the driving transistor, wherein the second switch is configured to control the driving transistor such that the driving current is reduced when the second switch is activated.

6. The light source driver of claim 5, wherein the second switch is activated when the first switch is activated.

7. The light source driver of claim 5, wherein the second switch is turned on approximately within a first predetermined amount of time after the first switch is turned on, and wherein the second switch is turned off within a second predetermined amount of time before the first switch is turned off wherein each of the first and second predetermined amount of time is less than 2 ns.

8. The light source driver of claim 1, wherein the biasing circuit is configured to generate reference voltage signals and reference current signals to operate the driving transistor.

9. The light source driver of claim 1, wherein the channel length modulation cancellation circuit comprises a fixed current biasing portion configured to maintain a substantially fixed biasing current in the second branch.

10. The light source driver of claim 1, wherein the channel length modulation cancellation circuit comprises a channel length modulation detector configured to generate the feedback signal.

11. The light source driver of claim 10, wherein the channel length modulation detector comprises a resistor configured to detect channel length modulation.

12. The light source driver of claim 11, wherein the biasing circuit comprises a first common configuration portion and the channel length modulation cancellation circuit comprises a second common configuration portion, wherein the first common configuration portion of the biasing circuit is substantially similar to the second common configuration portion of the channel length modulation cancellation circuit.

13. The light source driver of claim 12, wherein the first common configuration portion of the biasing circuit, and the second common configuration portion of the channel length modulation cancellation circuit comprise substantially similar components arranged in a substantially similar orientation.

14. The light source driver of claim 1, further comprising a peak current generator configured to provide an additional driving current to the at least one light source for a predetermined time period when the at least one light source is turned on.

15. The light source driver of claim 1, wherein:
the channel length modulation cancellation circuit comprise a mirrored current source, a fixed current source and a channel length modulation detector;
the fixed current source and the channel length modulation detector are arranged in a parallel arrangement; and
the mirror current source is connected in series to the fixed current source and the channel length modulation detector.

16. A method for cancelling channel length modulation caused by fluctuation of supply voltage, the method comprising:
providing a voltage supply through a ground terminal and a power terminal;
driving at least one light source in a first circuit branch between the ground terminal and the power terminal with a driving transistor configured to provide a driving current directly to the at least one light source;
sensing a channel length modulation via a channel length modulation cancellation circuit in a second circuit branch in parallel to the first circuit branch;
providing a feedback from the channel length modulation cancellation circuit to a gate terminal of the driving transistor so as to at least partially cancel out channel length modulation effects caused by fluctuation of the voltage supply; and
switching on an additional biasing current to the driving transistor so as to reduce the driving current.

17. The method of claim 16, further comprising circumventing the driving current driving the at least one light source to a bypassing circuit arranged in parallel to the at least one light source.

18. The method of claim 17, wherein the additional biasing current is provided by a biasing circuit that is configured to generate reference voltage signals and reference current signals to operate the driving transistor.

19. The method of claim 16, further comprising providing a peaking current to the at least one light source for a predetermined period of time when the at least one light source is turned on.

20. A driving apparatus configured to provide a drive current, the driving apparatus comprising:
a driving transistor having a gate terminal, a source terminal and a drain terminal;
a biasing circuit coupled to the gate terminal of the driving transistor;
at least one light source coupled to one of the source and drain terminals;
a peaking current generator coupled to the at least one light source either directly or indirectly, the peaking current generator being configured to provide a charge-up current to the at least one light source for a predetermined time period; and
a channel length modulation cancellation circuit configured to detect channel length modulation so as to provide a feedback signal indicative of the channel length modulation to the gate terminal of the driving transistor.

* * * * *